United States Patent Office 3,536,624
Patented Oct. 27, 1970

3,536,624
GREASE COMPOSITIONS OF FLUOROCARBON POLYETHERS THICKENED WITH POLYFLUOROPHENYLENE POLYMERS
John B. Christian, Yellow Springs, and Christ Tamborski, Dayton, Ohio, assignors to the United States of America as represented by the Secretary of the Air Force
No Drawing. Filed May 8, 1968, Ser. No. 727,671
Int. Cl. C10m 7/28, 7/16
U.S. Cl. 252—54     1 Claim

ABSTRACT OF THE DISCLOSURE

The invention comprises grease formulations of by weight seventy-eight to eighty percent fluorocarbon polyethers with thickener twenty to twenty-two percent polyfluorophenylene stable to 550° F.

BACKGROUND OF THE INVENTION

In the art of lubrication and, particularly of lubricants having sufficient dimensional stability to give them grease-like qualities or to classify them as greases, advancing technology is constantly demanding performance over wider temperature ranges and under a variety of hitherto unencountered conditions and environmental extremes. In aerospace engineering for example, extremely high temperatures such as those encountered upon atmospheric reentry must be accommodated and lubricity must be maintained by a grease-like substance which will keep its dimensional stability and, hence its association with the parts to be lubricated at high temperatures and high speeds. In the almost complete vacuum of outer space, lubricants are required which can maintain their grease-like consistency and lubricating capacity under extremely low pressure and at low temperatures.

While significant breakthroughs are being regularly made with regard to lubricating fluids to meet these increasingly demanding situations, the improvements in the fluids themselves have not been capable of being carried over into greases incorporating them. Consequently, while advancements in lubrication is generally moving forward, the grease art is not keeping pace.

Cases in point are the development of fluorocarbon polyethers which have been polymerized in a liquid state and have shown considerable promise as lubricating fluids. Attempts to utilize these liquids as a base for grease compositions are proving to be promising.

The application of Christ Tamborski (Ser. No. 727,687, filed May 8, 1968) for United States Letters Patent entitled "Polyfluorophenylene Polymers" reaches the preparation of these polymers by the polymerization of pentafluorophenyllithium or nonafluorobiphenyllithium. Attempts to utilize these solids as thickeners for grease compositions are also proving to be promising.

U.S. Pat. No. 3,242,218 to Miller teaches the process for the preparation of fluorocarbon polyethers. U.S. Pat. No. 3,214,478 to Milian relates to novel fluorocarbon polyethers.

SUMMARY OF THE INVENTION

Present invention relates to grease formulations based upon fluorocarbon polyether liquids and polyfluorophenylene thickeners. It is accordingly an object of this invention to provide an improved grease composition for operation over a wide temperature range and under exposure to a variety of abnormal or extreme environmental conditions.

Still another object of the present invention is to provide such a grease composition which is based upon and thereby utilize in greases the desirable properties of the fluid fluorocarbon polyethers.

Yet another object of the present invention is to provide a grease composition that will perform for prolonged periods of exposure to hyperthermal environments.

These and other objects and advantages which will appear from a reading of the following disclosure are achieved according to this invention by the employment of that class of materials which consists of polyfluorophenylene polymers as thickening additives to the fluorocarbon polyethers. It has been found that optimum grease consistency is achieved where the polyfluorophenylene polymer is employed in weight ratios of from twenty to twenty-two parts to from seventy-eight to eighty parts of the fluorocarbon polyether liquids.

The fluorocarbon polyethers employed in specific embodiments of the within invention have comprised those which have the following structures:

(1)     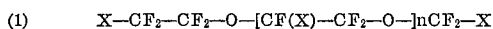

where $n$ is an integer of from 0 to 35 representing the number of —CF(X)—CF$_2$—O— units in the molecule, and where X is a member of the class consisting of fluorine and the perfluoromethyl radical. The preferred range of $n$ is from 8 to 11. A more complete description of these fluorocarbon polyethers is set forth in U.S. Pat. No. 3,242,218 to Miller.

(2) 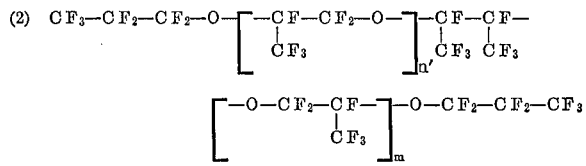

where $n'$ and $m$ are positive integers of at least 2. A more complete description of the compounds of structure (2) is set forth in U.S. Pat. No. 3,214,478 to Milian.

The polyfluorophenylene polymers employed in specific embodiments of the within invention have comprised those which are substantially free of bromine and have the following structure:

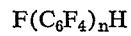

where $n$ has a value of at least 3 and advantageously at least 4.

In one embodiment of this invention a grease composition was made by utilizing eighty parts by weight of fluorocarbon polyether liquid and twenty parts by weight of the polyfluorophenylene polymer thickener. After these ingredients were thoroughly mixed, first by spatula blending and then by milling several passes through a three-roll mill, the mixture was subjected to conventional testing with the following results. On the ASTM D217–60T unworked penetration cone drop test, a value of 350 was achieved; and, after working the grease composition sixty strokes in the test device, a worked penetration reading of 358 was achieved. In a standard Pope spindle bearing test wherein the bearings were loaded with five pounds and operated at 10,000 revolutions per minute, the grease performed and allowed the test to continue demonstrating satisfactory lubricity for 223 hours at a temperature of 550° F.

In another example wherein seventy-eight parts by weight of the fluorocarbon polyether liquid and twenty-two parts by weight of the polyfluorophenylene thickener were combined in a grease composition, the same unworked penetration test gave a value of 330 while the worked penetration value was 334. In the same five-pound loaded bearing test at 10,000 revolutions per minute, the grease performed as a lubricant for more than 200 hours at 550° F.

By comparison, a grease composition comprising seventy parts by weight of the fluorocarbon polyether and thirty parts by weight of fluorinated ethylenepropylene co-polymer as the thickener, an unworked penetration value of 330 was obtained and the bearing test under five-pound load and at 10,000 revolutions per minute ran for only 170 hours at 550° F. The comparison shows that the polyfluorophenylene thickener is more efficient in thickening the fluorocarbon polyether to a grease consistency than is the fluorinated ethylene propylene co-polymer. The comparison also shows that the former grease composition yields longer life in the bearing test than does the latter grease composition under identical conditions.

By further comparison, a grease conforming to Military Specification MIL-G-25013, "Grease, Ball and Roller Bearing, Extreme High Temperature" yielded an unworked penetration value of 297, and performance in the bearing test under five-pound load and at 10,000 revolutions per minute lasted for less than 100 hours at 550° F.

While the within invention has been described in considerable detail in connection with certain specific examples and embodiments thereof, it is to be understood that the foregoing particularization and detail have been for the purposes of illustration only and do not limit the scope of the invention as defined in the subjoined claim.

What we claim is:
1. A grease composition comprising a major weight proportion of (a) a perfluorocarbon polyether fluid having the structure

$$X-CF_2-CF_2-O[-CF(X)-CF_2-O-]_nCF_2-X$$

where $n$ is an integer of from 8 to 11 and X is a member of the class consisting of fluorine and perfluoromethyl radical, and (b) a minor thickening amount of a polyfluorophenylene polymer having the structure $$F(C_6F_4)_nH$$

where $n$ has a value of at least 4.

References Cited

UNITED STATES PATENTS

| 2,915,471 | 12/1959 | Lorensen | 252—54 |
| 3,214,478 | 10/1965 | Millian | 252—54 |
| 3,242,218 | 3/1966 | Miller | 252—54 |
| 3,248,326 | 4/1966 | Swenson | 252—58 |
| 3,262,879 | 7/1966 | Messina | 252—58 |
| 3,432,432 | 3/1969 | Dreher | 252—54 |

DANIEL E. WYMAN, Primary Examiner

I. VAUGHN, Assistant Examiner

U.S. Cl. X.R.

252—58